(12) United States Patent
Neuhaus et al.

(10) Patent No.: US 10,306,634 B2
(45) Date of Patent: May 28, 2019

(54) COMMUNICATION DEVICE AND METHOD FOR PROCESSING A SIGNAL

(71) Applicant: INTEL IP CORPORATION, Santa Clara, CA (US)

(72) Inventors: Holger Neuhaus, Munich (DE); Rajarajan Balraj, Nuremberg (DE); Christian Faber, Munich (DE); Bertram Gunzelmann, Neubiberg (DE)

(73) Assignee: Intel IP Corporation, Santa Clara, CA (US)

( * ) Notice: Subject to any disclaimer, the term of this patent is extended or adjusted under 35 U.S.C. 154(b) by 70 days.

(21) Appl. No.: 15/357,797

(22) Filed: Nov. 21, 2016

(65) Prior Publication Data
US 2017/0181168 A1 Jun. 22, 2017

(30) Foreign Application Priority Data
Dec. 22, 2015 (DE) .................. 10 2015 122 564

(51) Int. Cl.
H04L 1/00 (2006.01)
H04L 5/00 (2006.01)
H04W 72/04 (2009.01)

(52) U.S. Cl.
CPC ........... H04W 72/0453 (2013.01); H04L 1/00 (2013.01); H04L 5/0007 (2013.01); H04L 5/0057 (2013.01)

(58) Field of Classification Search
CPC ....... H04L 1/00; H04L 1/0003; H04L 1/0009; H04L 5/0007; H04L 5/0053; H04L 5/0058; H04L 5/0062; H04W 72/0453
See application file for complete search history.

(56) References Cited

U.S. PATENT DOCUMENTS

| 6,230,125 | B1 * | 5/2001 | Vainio | ................... | G10L 19/005 |
| | | | | | 704/230 |
| 8,229,008 | B2 | 7/2012 | Jones et al. | | |
| 8,243,696 | B2 * | 8/2012 | Onggosanusi | ........ | H04W 36/18 |
| | | | | | 370/336 |
| 8,433,968 | B2 * | 4/2013 | Gotnnan | ............... | H04L 1/1845 |
| | | | | | 714/751 |
| 8,494,034 | B2 * | 7/2013 | Konishi | .................. | H04L 1/203 |
| | | | | | 375/219 |
| 8,693,561 | B2 | 4/2014 | Raju et al. | | |
| 9,014,309 | B1 | 4/2015 | Marupaduga et al. | | |
| 9,059,824 | B2 * | 6/2015 | Onggosanusi | ........ | H04L 5/0048 |
| 9,148,310 | B2 | 9/2015 | Kyung et al. | | |
| 9,178,738 | B2 | 11/2015 | Wilhelmsson et al. | | |

(Continued)

FOREIGN PATENT DOCUMENTS

EP 2224632 B1 1/2012

Primary Examiner — Eric Nowlin
(74) Attorney, Agent, or Firm — Lowenstein Sandler LLP

(57) ABSTRACT

According to an example, a communication device is described comprising a receiver configured to receive a signal, a divider configured to divide the signal into signal components, an estimator configured to estimate, for each signal component, an expected processing error which is made when, instead of a first processing scheme, a second processing scheme is used to process the signal component, wherein the first has a higher processing effort than the second, a determiner configured to determine, for each signal component, whether to process the signal component by the first or by the second processing scheme based on the expected processing errors.

19 Claims, 11 Drawing Sheets

(56) References Cited

U.S. PATENT DOCUMENTS

| | | | |
|---|---|---|---|
| 9,544,121 B2 * | 1/2017 | Balraj | H04L 1/0003 |
| 9,655,059 B2 * | 5/2017 | Clausen | H04W 52/243 |
| 2010/0202370 A1 * | 8/2010 | Liao | H04L 1/0003 370/329 |
| 2010/0260151 A1 * | 10/2010 | Onggosanusi | H04W 36/18 370/336 |
| 2010/0332957 A1 * | 12/2010 | Kamoshida | G06F 7/535 714/819 |
| 2011/0261868 A1 * | 10/2011 | Bachl | H04L 1/206 375/224 |
| 2012/0069875 A1 * | 3/2012 | Konishi | H04L 1/203 375/219 |
| 2013/0028354 A1 * | 1/2013 | Lindoff | H04B 7/0845 375/340 |
| 2013/0064111 A1 * | 3/2013 | Linsky | H04W 52/243 370/252 |
| 2013/0195023 A1 * | 8/2013 | Vaisanen | H04L 1/20 370/329 |
| 2014/0050201 A1 * | 2/2014 | Onggosanusi | H04L 5/0048 370/336 |
| 2014/0294130 A1 * | 10/2014 | Umeda | H04L 25/022 375/349 |
| 2014/0321521 A1 * | 10/2014 | Lee | H04W 24/02 375/227 |
| 2015/0092583 A1 * | 4/2015 | Balraj | H04L 1/0003 370/252 |
| 2015/0124901 A1 * | 5/2015 | Xu | H04B 17/00 375/267 |
| 2015/0162964 A1 * | 6/2015 | Chung | H04B 7/0473 370/335 |
| 2015/0229493 A1 * | 8/2015 | Lee | H04L 25/022 370/252 |

* cited by examiner

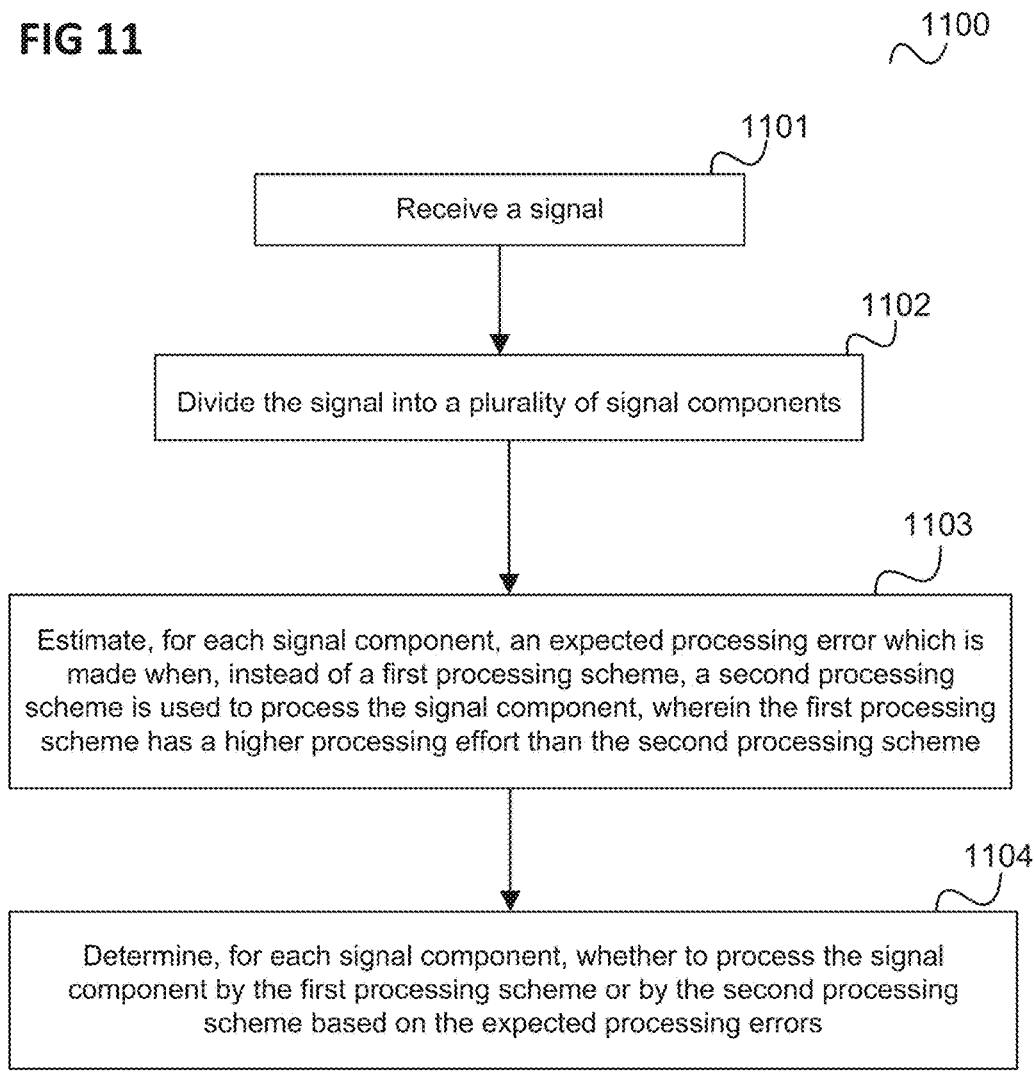

COMMUNICATION DEVICE AND METHOD FOR PROCESSING A SIGNAL

RELATED APPLICATION

This application claims priority to German Patent Application No. 10 2015 122 564.6, filed Dec. 22, 2015, the contents of which are hereby incorporated by reference herein.

TECHNICAL FIELD

Embodiments described herein generally relate to communication devices and methods for processing a signal.

BACKGROUND

In mobile communication systems, link quality measurements are typically used to optimize the performance of a communication connection. For this, the receiver, e.g. a mobile terminal, performs a determination of the reception quality of signals received from the transmitter, e.g. a base station. However, there exist scenarios, such as heterogeneous network conditions, where an accurate determination of the reception quality of signals requires a large amount of computational resources. Therefore, approaches are desirable which allow reducing the computational effort for the determination of reception qualities while keeping the accuracy loss as low as possible.

BRIEF DESCRIPTION OF THE DRAWINGS

In the drawings, similar reference characters generally refer to the same parts throughout the different views. The drawings are not necessarily to scale, emphasis instead generally being placed upon illustrating the principles of the invention. In the following description, various aspects are described with reference to the following drawings, in which:

FIG. 11 shows a flow diagram illustrating a method for processing a signal.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
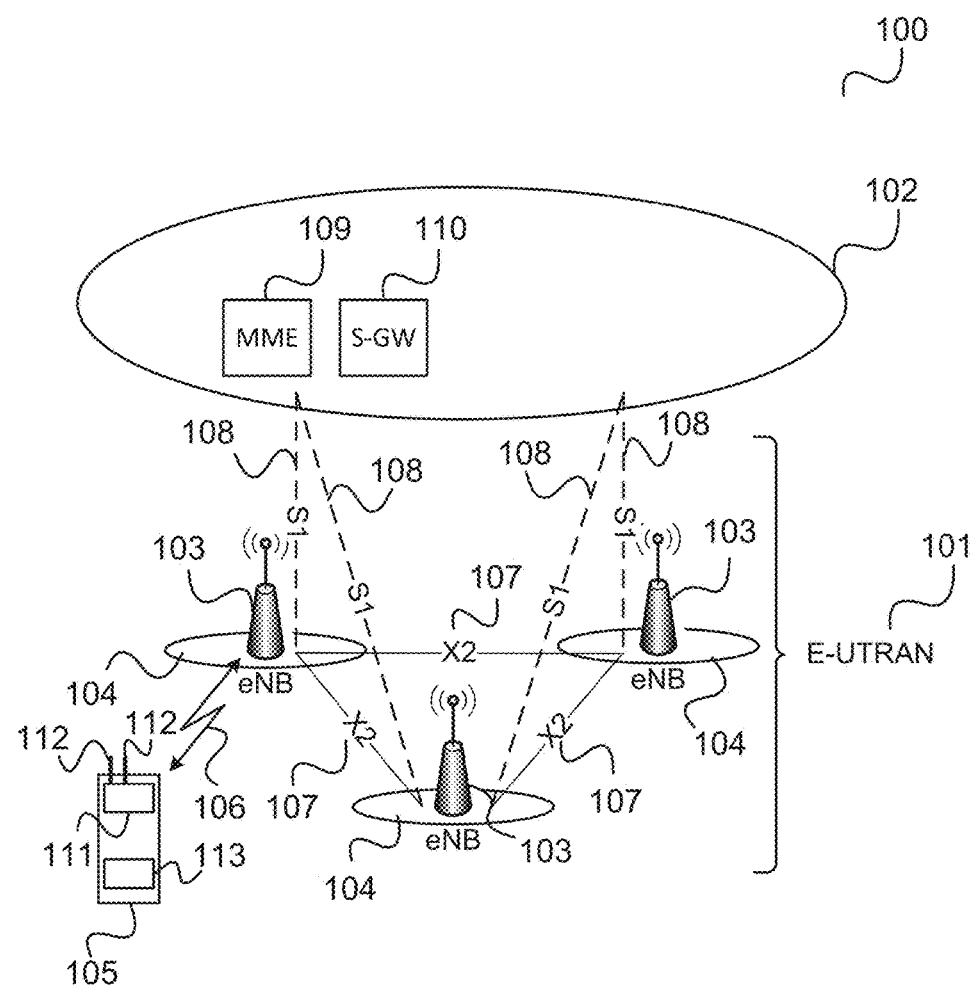
FIG. 1 shows a communication system, e.g. an LTE (Long Term Evolution) communication system.

FIG. 1 shows a communication system 100, e.g. an LTE (Long Term Evolution) communication system.

The communication system 100 includes a radio access network (e.g. an E-UTRAN, Evolved UMTS (Universal Mobile Communications System) Terrestrial Radio Access Network according to LTE) 101 and a core network (e.g. an EPC, Evolved Packet Core, according LTE) 102. The radio access network 101 may include base (transceiver) stations (e.g. eNodeBs, eNBs, according to LTE) 103. Each base station 103 provides radio coverage for one or more mobile radio cells 104 of the radio access network 101.

A mobile terminal (also referred to as UE, user equipment, or MS, mobile station) 105 located in a mobile radio cell 104 may communicate with the core network 102 and with other mobile terminals 105 via the base station providing coverage in (in other words operating) the mobile radio cell.

Control and user data are transmitted between a base station 103 and a mobile terminal 105 located in the mobile radio cell 104 operated by the base station 103 over the air interface 106 on the basis of a multiple access method.

The base stations 103 are interconnected with each other by means of a first interface 107, e.g. an X2 interface. The base stations 103 are also connected by means of a second interface 108, e.g. an S1 interface, to the core network, e.g. to an MME (Mobility Management Entity) 109, and a Serving Gateway (S-GW) 110. For example, the MME 109 is responsible for controlling the mobility of mobile terminals located in the coverage area of E-UTRAN, while the S-GW 110 is responsible for handling the transmission of user data between mobile terminals 105 and core network 102.

The radio access network 101 and the core network may support communication according to various communication technologies, e.g. mobile communication standards. For example, each base station 103 may provide a radio communication connection via the air interface between itself and the mobile terminal 105 according to LTE, UMTS, GSM (Global System for Mobile Communications), EDGE (Enhanced Data Rates for GSM Evolution) radio access. Accordingly, the radio access network 102 may operate as an E-UTRAN, a UTRAN, a GSM radio access network, or a GERAN (GSM EDGE Radio Access Network). Analogously, the core network 102 may include the functionality of an EPC, a UMTS core network or a GSM core network.

In a communication between a transmitter (e.g. the base station 103 serving the mobile terminal 105) and a receiver (e.g. the mobile terminal 105) in a mobile communication system like the communication system 100, link quality measurements are typically provided by the receiver to the transmitter and are used by the transmitter to optimize downlink communication parameters such as those related to channel coding or the choice of a modulation constellation type of the communication. For this, the mobile terminal may include a link quality estimator 113 which estimates a link quality which the mobile terminal 105 sends to its serving base station 103 via its transceiver 111 and its antenna 112.

For example, CSI (Channel State Information) feedback reporting in LTE includes downlink recommendations for rank (rank indicator RI), precoding (precode matrix indicator PMI) and modulation and coding schemes (MCS) which the transmitter uses to optimize data transfer in downlink.

One way to determine optimum link quality recommendations is by maximizing a metric such as the mutual information (MI) I which is derived from the estimated downlink signal quality. This downlink signal quality could e.g. be the post-detection SINR γ being a function of the channel estimate of a pilot reference signal and an estimate of noise and interference:

γ=$f$(wanted-signal,noise&interference),$I$=$f_2$(γ)

In the simplest case, one reference signal estimate and one noise & interference estimate can be a representative basis for an accurate link quality assessment. However, in more complex receive scenarios, such as e.g. heterogeneous network configurations, certain parts of the received signal might experience a significantly different type and strength of noise & interference and this typically needs to be considered for accurate feedback reporting.

In these more complex link scenarios a link quality assessment thus may be composed of a multitude of measurements for signal groups which (at least partially) undergo separate processing. This is illustrated in FIG. 2.

Figure 2:
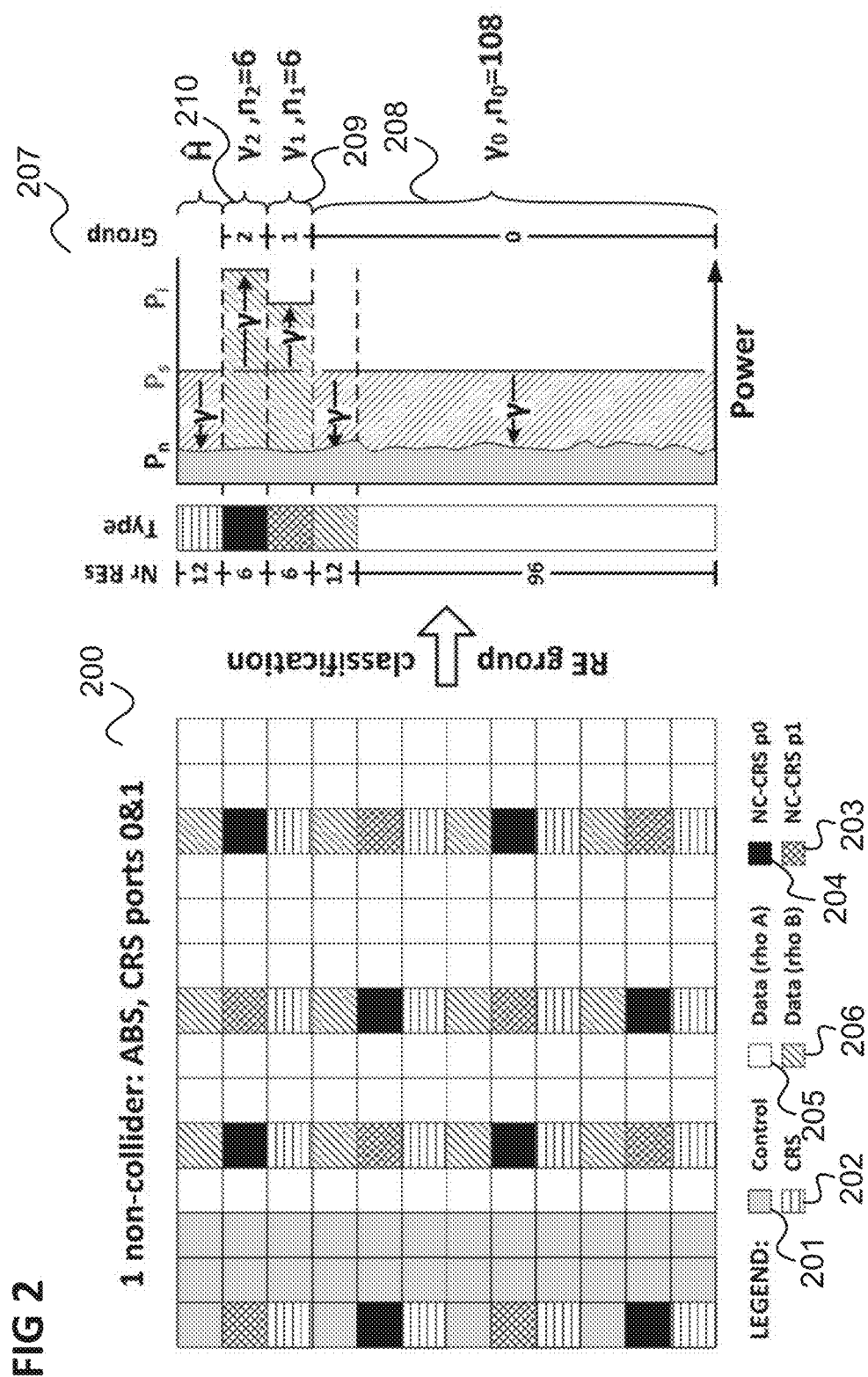
FIG. 2 shows a time/frequency grid of a resource block (RB) pair in the context of LTE.

FIG. 2 shows a time/frequency grid 200 of a resource block (RB) pair in the context of LTE. Each of the twelve rows of the time/frequency grid 200 corresponds to a subcarrier and each column of the time/frequency grid 200 corresponds to an OFDM symbol wherein the first seven OFDM symbols belong to the first resource block of the pair of OFDM symbols and the second seven OFDM symbols belong to the second resource block of the pair of OFDM symbols. Accordingly, the time/frequency grid 200 includes 12 times 14 so-called resource elements.

In this example, the first three OFDM symbols are used for control data (indicated by shading 201) and the other OFDM symbols are used for useful data. Resource elements with horizontal hatching 202 in both the control part and the data part are used for CRS (Cell-specific Reference Signal) transmission.

The remaining resource elements include those with little interference (those indicated as white squares 205 and those indicated with diagonal hatching 206, e.g. differing in their reception quality) and those which suffer from additional interference, namely those resource elements which suffer from lighter interference (indicated by cross hatching 203) and those resource elements which suffer from stronger interference (shown as solid squares 204).

In this example, the whole set of resource elements (RE) may be divided into several (e.g. three in this example) signal groups where the signal quality is significantly different between groups but comparable for all REs within the same group. To the right side of the time/frequency grid 200, a RE group classification diagram 207 is shown wherein the resource elements are grouped into three groups according to the interference (none, light, strong) they experience as given by their SINRs $\gamma_0, \gamma_1, \gamma_2$.

One way to combine different downlink conditions follows the principle of weighted metric combining (WMC) where the mutual information (MI) for each group i (i=1, 2, 3) is first calculated separately $I_i$=$f_2$($\gamma_i$), and thereafter, using weights $\psi_i$, combined to a single value I=$\Sigma_i \psi_i I_i$. The weights could be directly derived from the number $n_i$ of affected REs in each group $$\psi_i = \frac{n_i}{\sum_i n_i}.$$

In the example, the weights would be $$\psi_i = \left\{\frac{108}{120}, \frac{6}{120}, \frac{6}{120}\right\} = \{0.90, 0.05, 0.05\},$$

representing the percentage of affected REs.

However, with increasing scenario complexity, limited resources might demand that the most accurate available processing cannot be applied to all of these signal groups but instead for some a simplified—and consequently usually inferior method—has to be used. In such cases, a selection method is required which controls the allocation of processing methods to signal groups.

Signal groups may be allocated to calculation scheme based on criteria, such as e.g. based on SINR estimates, which, however, cannot directly be used to predict the best allocation choice and are thus typically suboptimal. Thus, compared to an optimized selection method, such an approach will either need higher complexity for the same quality of measurement reports or produce measurement reports of lower quality for a given constraint in complexity.

In the following an approach is described for a scenario in which it is assumed that due to heterogeneous signal conditions a link quality estimator (such as the link quality estimator 113) has to separately consider the partial impact of multiple signal groups. It is further assumed that the link quality estimator supports a high effort & accuracy procedure (i.e. a high effort processing) and a low effort & accuracy procedure (i.e. a low effort processing) to determine the partial impact of a signal group to the link quality estimate and that insufficient resources exist to use the high effort & accuracy method for all signal groups and a bias (or accuracy loss) by using the low-effort processing can be estimated very efficiently.

In such a scenario, the link quality estimator estimates, for each of a plurality of signal groups, e.g. as in the example of FIG. 2, the bias (or accuracy loss) when using the low-effort processing instead of the high-effort processing and optimizes the allocation of using the high effort processing versus the low effort processing to the signal groups based on minimizing the overall predicted bias (or accuracy loss).

For example, let a mobile terminal (UE) use an LTE communication system (e.g. as in FIG. 1) in heterogeneous network conditions where there are multiple non-collider ABS (almost blank subframe) interferers each impacting RX data signal quality for a particular set of resource elements and let the UE calculate link quality feedback (FB) reports by using mutual information (MI) as core metric.

It is assumed that the computational resources of the UE CSI FB calculation can support a high-accuracy calculation scheme of the partial impact to link quality of the interferers only for some of them, while the UE (e.g. its link quality estimator 113) others have to be handled via processing schemes of lower complexity as e.g. puncturing.

A high-accuracy calculation scheme for mutual information based CSI FB estimation per signal component could e.g. include signal processing such as: whitening of channel estimates according to the noise & interference estimates associated to the signal component, (if applicable) used for calculation of effective channel estimates for each precoding candidate, used for calculation of the post-detection SINR, used for calculation of the Gaussian channel capacity, used for calculation of the mutual information for each allowed modulation constellation. (The following processing may happen in the metric combiner.)

Puncturing for example includes the two possibilities that an interfered resource element (RE) is either treated as having the same quality as the non-interfered REs or treated as being so strongly interfered such that no useful signal is left, i.e. the RE cannot be used for transmission of useful data.

The UE for example determines SINR estimates for each of a plurality of signal groups (i.e. RE groups e.g. as in FIG. 2), wherein certain signal groups correspond to certain interferers, i.e. determines a dedicated SINR estimate for the non-interfered REs (group 0 in FIG. 2) and each RE group subject to interference (groups 1 and 2 in FIG. 2). The UE approximates the MI from the SINR estimates for each RE group and, for each RE group, predicts the MI bias when using one of the puncturing methods as opposed to using the high-accuracy FB calculation scheme. The UE then allocates puncturing methods to the required number of RE groups such that the overall expected MI bias is minimized.

This approach allows improving the accuracy versus effort-optimization trade-off for link quality measurements based on multiple at least partially separately processed contributors with respect to approaches which use suboptimum criteria for the allocation of high versus low effort calculation scheme as e.g. interference strength associated to each signal group.

Thus, overall performance can be improved since a link quality accuracy improvement within a given complexity constraint usually leads to throughput improvement.

Figure 3:
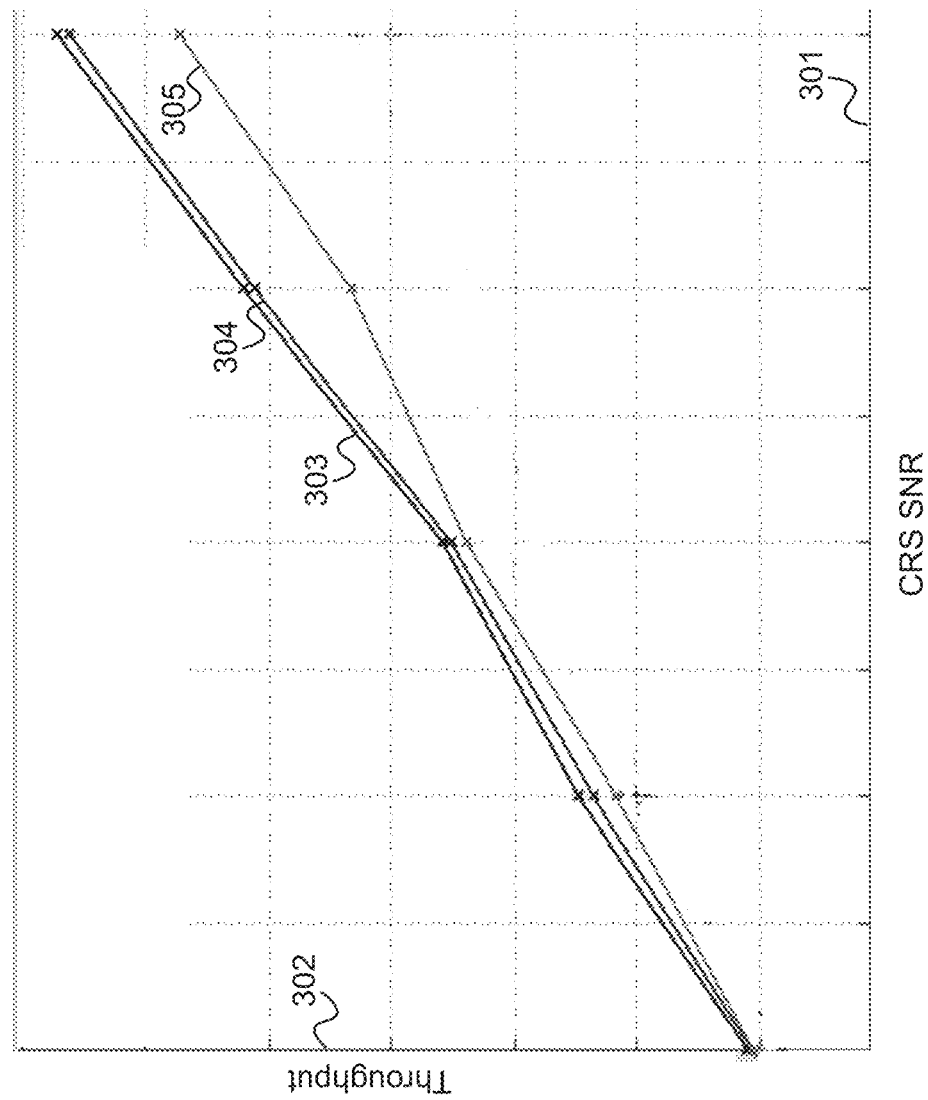
FIG. 3 illustrates a performance example which demonstrates the superiority of the above approach in terms of better throughput in the context of an LTE link level simulation.

FIG. 3 illustrates a performance example which demonstrates the superiority of the above approach in terms of better throughput in the context of an LTE link level simulation.

In FIG. 3, the CRS SNR increases from left to right along the horizontal axis 301 and the throughput that can be achieved based on the various link estimation schemes which are illustrated increases from bottom to top along the vertical axis 302.

The simulated scenario is
TM3 (transmission mode 3), fixed rank 2, 5 MHz bandwidth, 4×2 antenna configuration
ETU-20 Hz, low correlation
Two non-colliding ABS interferers, each with 4 antenna ports, resulting in a total of 8 interferer RE groups.
CQI (Channel Quality Indicator) feedback controls downlink MCS selection A first graph 303 illustrates the performance of partial feedback contribution of all RE-groups being calculated with high-effort method with channel estimation and whitening being ideal.

A second graph 304 illustrates the performance of 2 RE-groups being calculated with high-effort method, 6 with puncturing, allocation done according to the approach above (iterative approach) with channel estimation and whitening being ideal A third graph 305 illustrates the performance of 2 RE-groups being calculated with high-effort method, 6 with puncturing, allocation selects two strongest interferers for high-effort calculation, the remaining interferers for puncturing with channel estimation and whitening being ideal.

The throughput comparison of FIG. 3 shows that the approach described above shows a performance close to that using high-effort calculation for all RE-groups, while the approach selecting two strongest interferers for high-effort calculation and applying puncturing to the remaining interferers has inferior performance.

In the following, an example is described in more detail with reference to FIG. 4.

Figure 4:
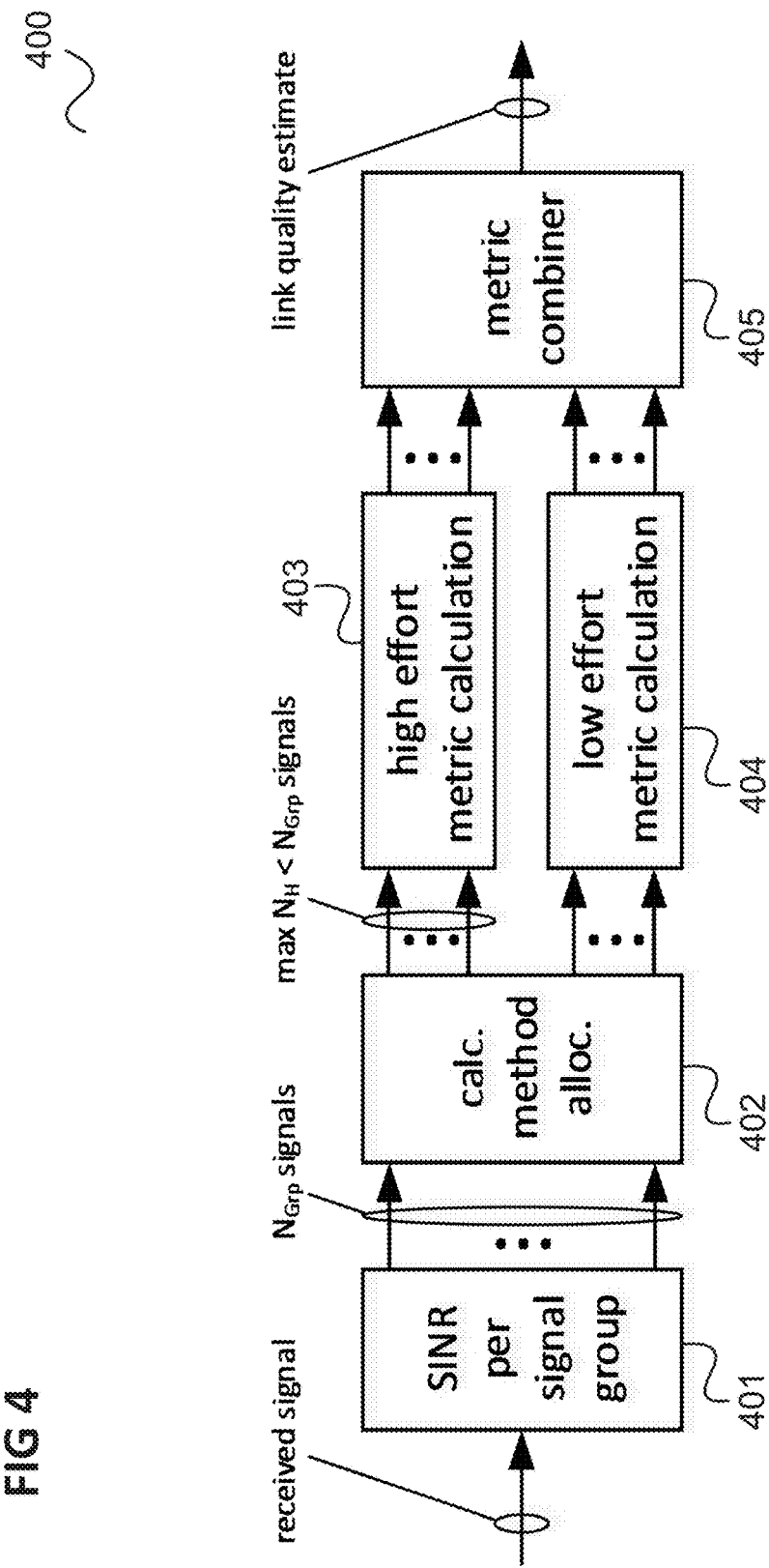
FIG. 4 shows a link quality estimator.

FIG. 4 shows a link quality estimator 400, for example corresponding to the link quality estimator 113 of the mobile terminal 105.

It is assumed that a mobile terminal such as the mobile terminal 105 has to determine the link quality for a received signal and that the related calculation requires partially independent calculation steps for multiple distinct signal groups as illustrated in FIG. 2.

The received signal is divided in $N_{Grp}$ signal groups. For example, the received signal is divided into the separate signal groups and a SINR determination block 401 determines the signal-to-noise-and-interference-ratio (SINR) for each signal group.

Based on the results of the SINR determination block 401, calculation method allocator 402 performs a calculation scheme allocation, i.e. allocates a calculation scheme (or processing) to each signal group wherein it takes into account that only a subset of $N_{Hmax}$ signal groups can be processed by a high effort (or high quality) calculation scheme while a low effort processing has to be applied to the remaining $N_L = N_{grp} - N_{Hmax}$ signal groups.

Accordingly, the calculation method allocator 402 distributes the signal groups to a high effort metric calculation block 403 and a low effort metric calculation block 404. Which each determine link quality estimates (e.g. in terms of the value of a metric) for the respective signal groups.

A metric combiner 405 combines the partial link quality estimation results to a single estimate.

Figure 5:
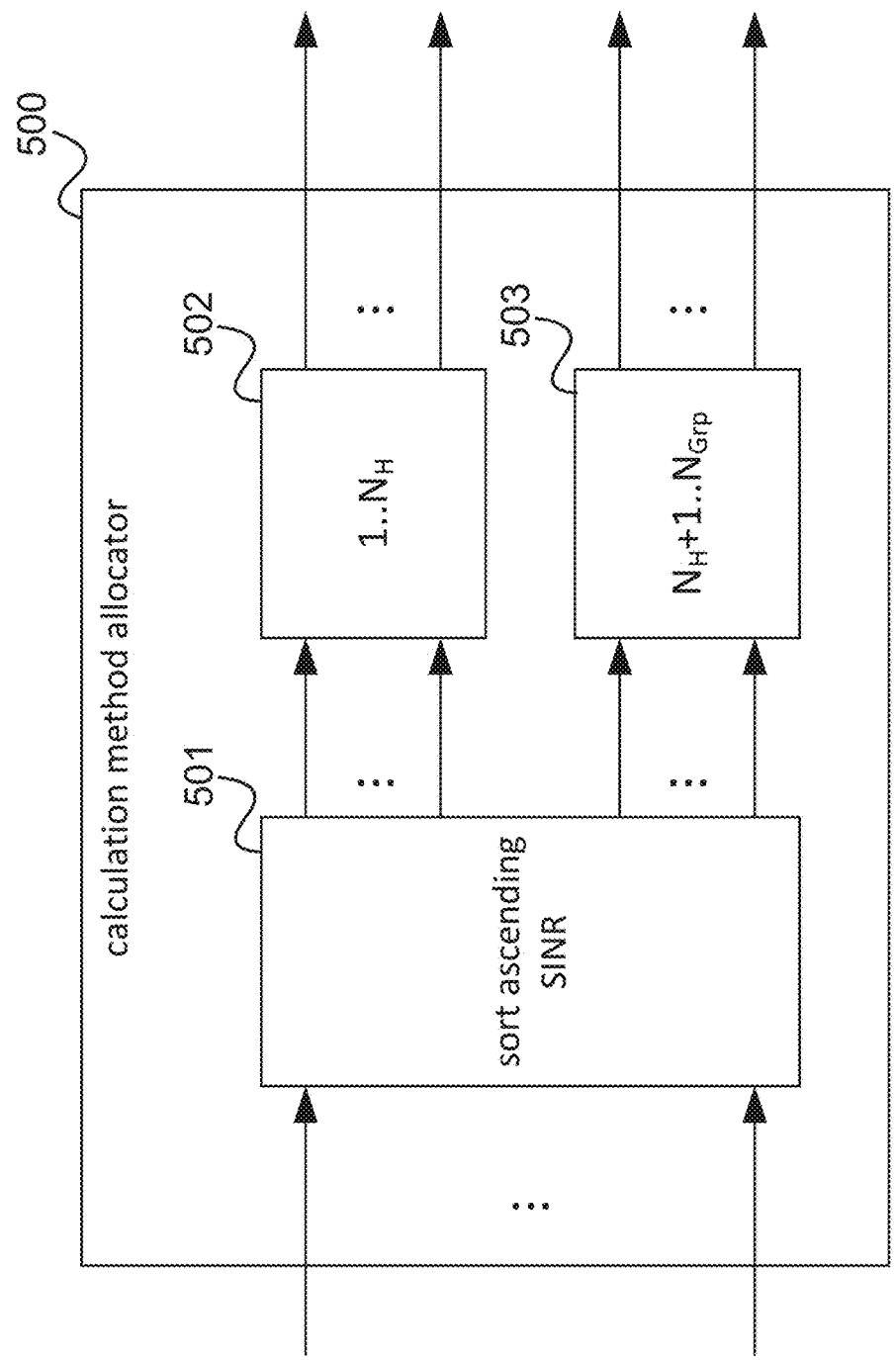
FIG. 5 shows a calculation scheme allocator.

As mentioned above, the calculation scheme allocator 402 may rely e.g. on the anyhow available SINR ratios in order to allocate signal groups to either the high- or low-effort calculation scheme as illustrated in FIG. 5.

FIG. 5 shows a calculation scheme allocator 500.

The calculation scheme allocator 500 includes a sorter 501 which sorts the signal groups by their SINR ratio, then allocates those with the strongest SINR ratio 502 to the high-effort/high-quality processing and the others 503 to the low-effort/low-quality processing.

In contrast, according to an example of the approach as provided here, the calculation scheme allocator 402 uses an allocation scheme where for each signal group, the approximate expected bias or error resulting from using the low-effort calculation scheme versus the high-effort calculation scheme is predicted in a signal domain more relevant to the link quality reporting.

Figure 6:
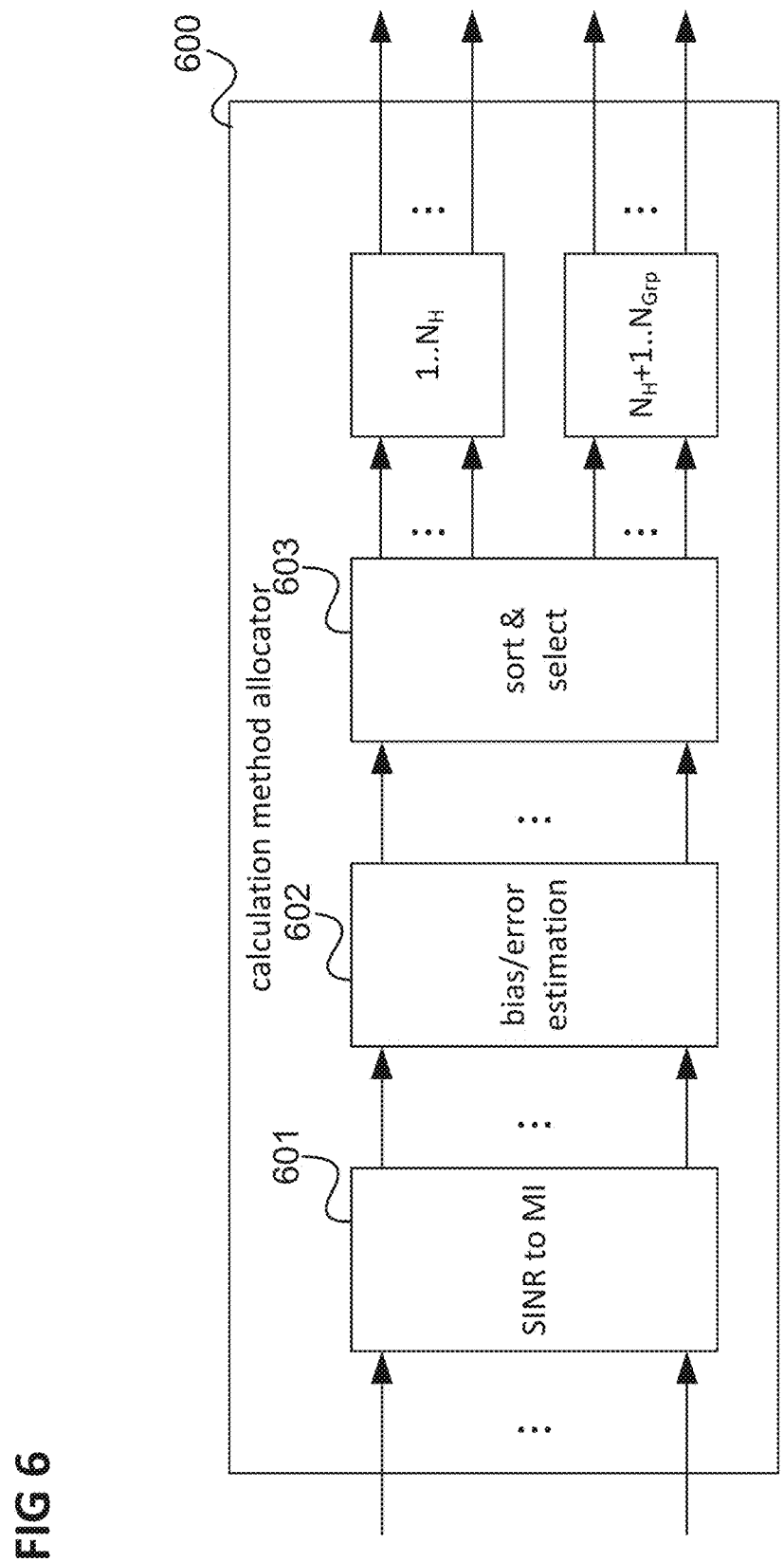
FIG. 6 shows another calculation scheme allocator.

FIG. 6 shows a calculation scheme allocator 600.

The calculation scheme allocator 600 includes a converter 601 which receives the SINR estimates from the SINR determination block 401 and converts the SINR estimates for each signal group, e.g. to expected wideband mutual information (MI) values. For these MI values, a bias/error estimator 602 determines the approximate bias which is caused when using the low-effort calculation scheme instead of the high-effort calculation scheme for a respective signal group. An allocator 603 allocates the signal groups to the calculation method by minimizing the overall bias plus adhering to any potentially additional side conditions and e.g. relevant weighting schemes.

In the context of LTE, a link quality estimate might have to be calculated for a particular subframe (SF), where the signal groups would consist of resource elements (RE) at particular time- and frequency-positions within such a SF, being subject to dedicated SINR conditions as e.g. induced by non-collider ABS interference.

A side condition (taken into account by the allocator 603) could be to keep the overall MI bias negative in order to reduce the risk of high block error rates (BLER) resulting in high throughput (TP) loss. A weighting scheme could for example consider the number of affected REs for each of the RE groups.

In the following, it is assumed that the number of RE-groups to be processed partially independent is $N_{Grp}$ the maximum number of RE-groups which can be handled using the high-effort calculation method is $N_{Hmax} < N_{Grp}$ the signal to interference and noise (SINR) estimate $\gamma_i$ is available for each RE-group RE-group 1 has the highest SINR. In LTE heterogeneous network scenarios, this may for example be the SINR estimate based on the target cell CRS pilot signal, applicable to all REs not experiencing any other additional interference.

The calculation scheme allocator 600 for example performs the following:

1. For each RE-group, the converter 601 approximates the expected wideband MI $I_i$ from the SINR estimates $\gamma_i$. A low effort conversion might be as follows, where M is a factor depending on the maximum modulation type and c is a tuning parameter.

$$I_i = M\left[1 - \frac{1}{1 + c\gamma_i}\right]$$

2. For each RE-group the bias/error estimator 602 predicts the expected MI bias resulting if instead the high-effort calculation either of the puncturing methods is used, $B_{0,i}$ for puncturing to zero and $B_{1,i}$ for puncturing to the reference RE group. It weighs the expected bias by the number of affected REs $N_{RE,i}$.

$B_{0,i} = N_{RE,i} I_i$ $B_{1,i} = N_{RE,i}(I_1 - I_i)$

3. The allocator 603 determines from the total number of RE-groups $N_{Grp}$ the number of RE groups $N_L$ that cannot be processed using the high effort calculation method $N_L = N_{Grp} - N_{Hmax}$ 4. Further, the allocator 603 allocates puncturing methods to the required number of RE groups $N_L$ such that the magnitude of the overall expected MI bias B is minimized according to the following, wherein set $\mathbb{P}_0$ contains the RE-group indices i for which puncturing to zero has been allocated whereas set $\mathbb{P}_1$ contains the RE-group indices for which puncturing to the reference RE-group has been decided and the set $\mathbb{H}$ contains all remaining $N_{Hmax}$ RE-groups for which the high effort calculation method is used:

$$B = \sum_{\forall i \in \mathbb{P}_0} B_{0,i} + \sum_{\forall i \in \mathbb{P}_1} B_{1,i}$$

$|\mathbb{P}_0| + |\mathbb{P}_1| = N_L$ $|\mathbb{P}_0| + |\mathbb{P}_1| + |\mathbb{H}| = N_{Grp}$ $(\mathbb{P}_0, \mathbb{P}_1) = \arg\min |B|$ $\mathbb{H} = \{i \mid \forall i \notin (\mathbb{P}_0 \cup \mathbb{P}_1)\}$ a. Optionally, an additional side condition for the allocation could be to require the overall expected MI bias B to be below or above a threshold $B_{thr}$. For LTE link adaptation feedback reports one possibility is to limit the bias to be negative, i.e.

$B_{thr} = 0 \wedge B < B_{thr}$, since positive, i.e. too optimistic, link quality reports can result in high throughput loss.

b. One way to determine the sets $\mathbb{P}_0$ and $\mathbb{P}_1$ could use an exhaustive search in order to minimize B.

c. Another way could be an iterative approach where
   i. the expected biases $B_{0,i}$ and $B_{1,i}$ are sorted in ascending order
   ii. then $N_L$ times, from the not yet allocated RE-groups, the next puncturing method and RE-group from either sorted list (corresponding to $B_{0,i}$ and $B_{1,i}$) is selected that results in the smallest overall bias B while fulfilling all side conditions.

An example to illustrating the benefit of the approach used by the calculation scheme allocator 600 with respect the calculation scheme allocator 500 in the context of LTE link quality calculation is described in the following with reference to FIGS. 7 to 9.

A scenario is assumed with 2 ABS non-collider interferers, each with two transmit antennas at particular interference-to-noise levels (INR), disturbing signal quality on certain REs within a SF grouped to RE groups 1 to 4. Interference power and noise power result in SINR levels 1 to 4. The majority of REs experiences no extra interference and is associated with the "reference" RE-group, associated to which is the signal to noise ratio SNR as e.g. measured on the target cell common reference signal (CRS).

It is assumed that link quality estimation is based on the mutual information (MI) as core metric and that the high-effort calculation scheme can only be used for 2 out of the 4 interfered RE groups and that the low-effort calculation scheme can be either one of two following puncturing schemes:

puncturing an RE group to zero assumes that all REs within that group do not contribute any meaningful information which is equivalent to a mutual information of zero (first puncturing scheme)

puncturing an RE group to a reference RE group assumes that all REs within that group experience a link quality similar to that of REs in the reference RE group, i.e. the mutual information is assumed equal to that of the reference RE-group (second puncturing scheme).

Figure 7:
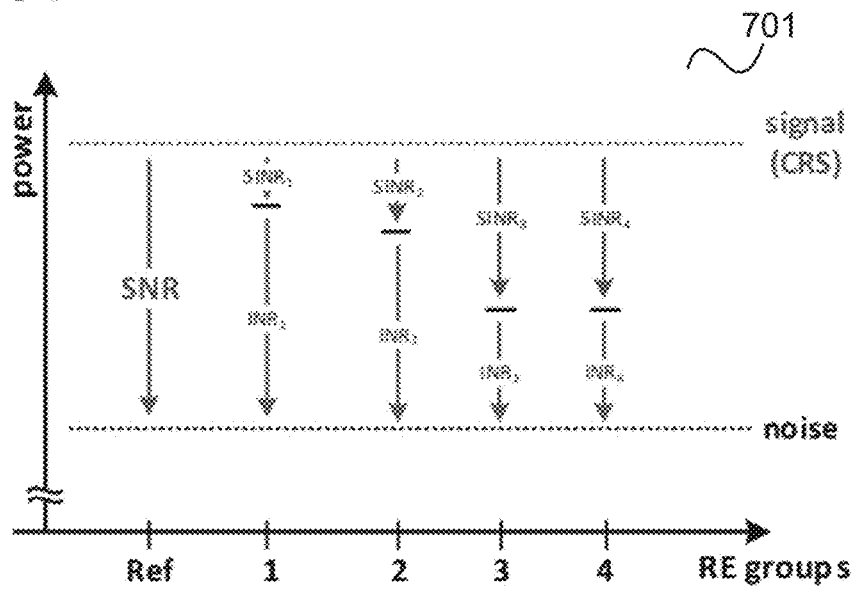
FIG. 7 illustrates the calculation scheme allocation according to the calculation scheme allocator of FIG. 5.
Figure 7:
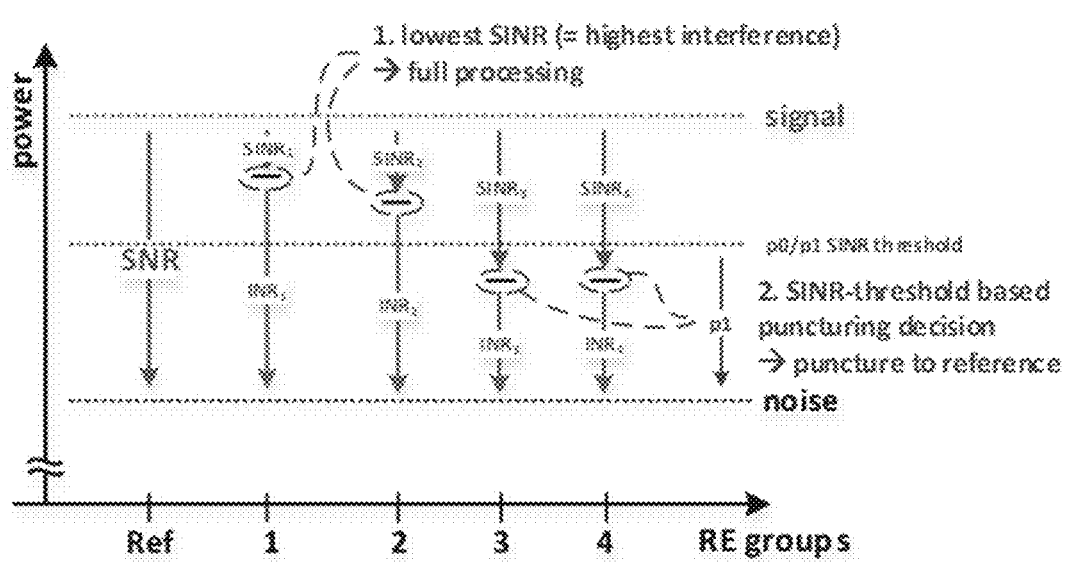

FIG. 7 illustrates the calculation scheme allocation according to the calculation scheme allocator 500.

A first diagram 701 illustrates, for the reference group (REs used for CRS transmission) as well as for the four RE groups 1 to 4 (from left to right), the signal to noise ratio (for the reference group) and the SINRs and INRs for the four RE groups.

The calculation scheme allocator 500 chooses the two RE groups for the high-effort calculation scheme based on the SINR ratio. In this example, as illustrated in a second diagram 702, the calculation scheme allocator 500 selects RE group 1 and RE group 2 for the high-effort processing and assigns a puncturing method for RE groups 3 and 4 as the low-effort processing, with the decision between the two puncturing methods e.g. being based on an SINR threshold.

Figure 8:
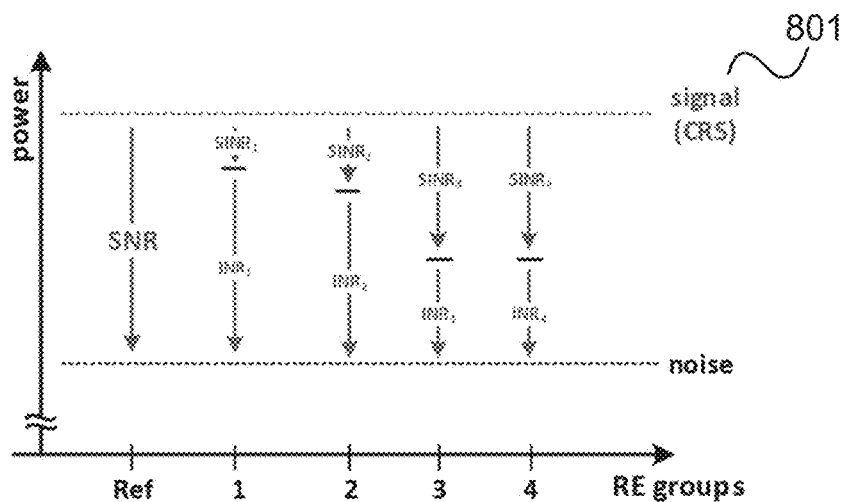
FIG. 8 illustrates the calculation scheme allocation according to the calculation scheme allocator of FIG. 6.
Figure 8:
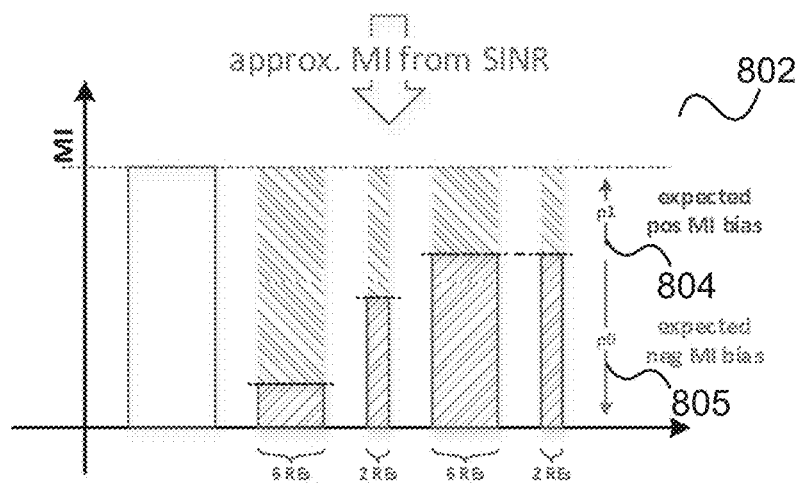
Figure 8:
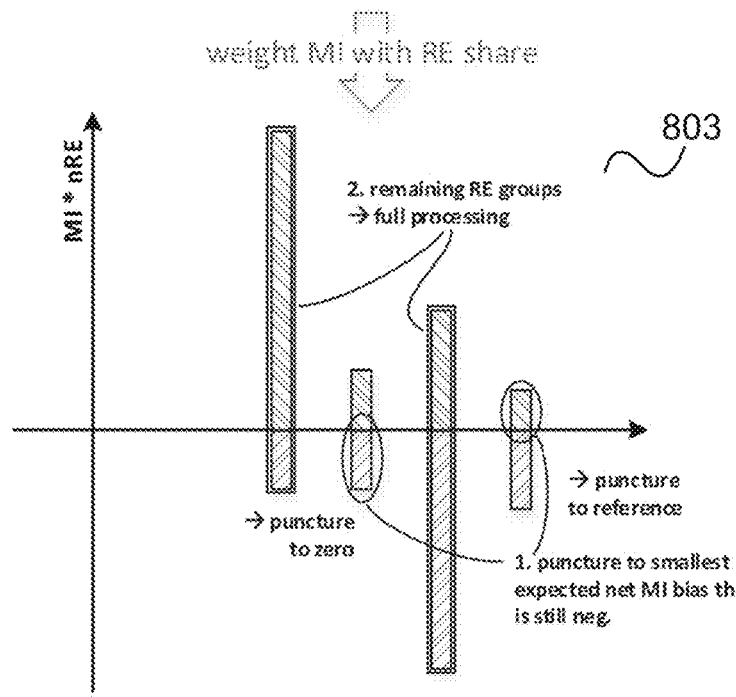

FIG. 8 illustrates the calculation scheme allocation according to the calculation scheme allocator 600.

A first diagram 801 illustrates, for the reference group (REs used for CRS transmission) as well as for the four RE groups 1 to 4 (from left to right), the signal to noise ratio (for the reference group) and the SINRs and INRs (interference to noise ratios) for the four RE groups.

The calculation scheme allocator 600 first maps the SINR values of each RE group to expected wideband mutual information values as illustrated in a second diagram 802 and calculates the expected MI bias resulting from using either puncturing scheme for each group. Puncturing to reference results in positive MI bias 804 and puncturing to zero results in negative MI bias 805.

The calculation scheme allocator 600 then weighs each MI bias with the number of REs of the respective group as illustrated in a third diagram 803, wherein it is assumed that RE group 1 and RE group 3 each include 6 REs and RE group 2 and RE group 4 each include 2 REs.

Based on the weighted MI bias values, the calculation scheme allocator 600 determines, for each RE group, whether it is to be allocated to the high-effort processing, the first puncturing scheme or to the second puncturing scheme such that the overall expected bias is minimized and kept on the negative side.

Figure 9:
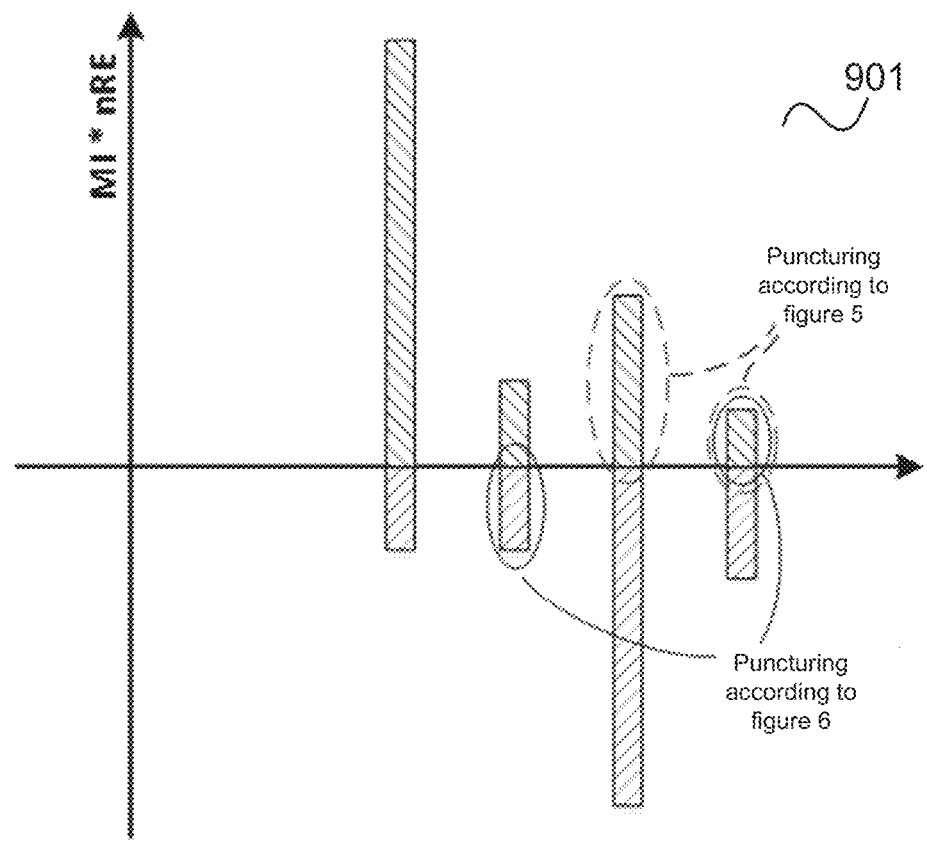
FIG. 9 shows a comparison between the allocation result of the calculation scheme allocator of FIG. 5 and the allocation result of the calculation scheme allocator of FIG. 6.
Figure 9:
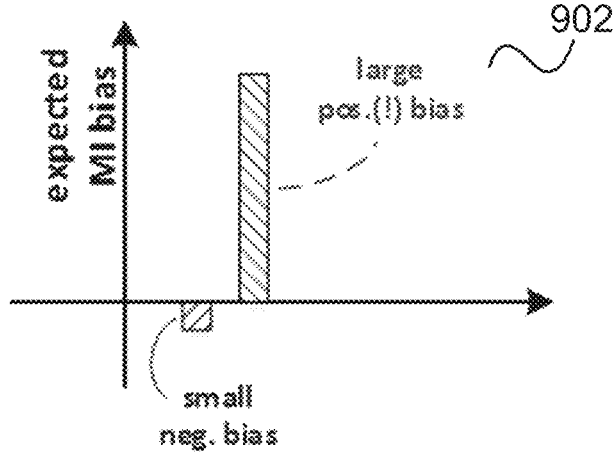

FIG. 9 shows a comparison between the allocation result of the calculation scheme allocator 500 and the allocation result of the calculation scheme allocator 600.

As illustrated in a first diagram 901, the calculation scheme allocator 500 punctures RE groups 3 and 4 to reference while calculation scheme allocator 600 punctures RE group 2 to zero and RE group 4 to reference.

As shown in the second diagram 902, this results in a small negative total bias for the calculation scheme allocator 600 and a much larger positive total bias for the calculation scheme allocator 500. It should be noted that a large positive MI bias may lead to significant throughput reduction.

Figure 10:
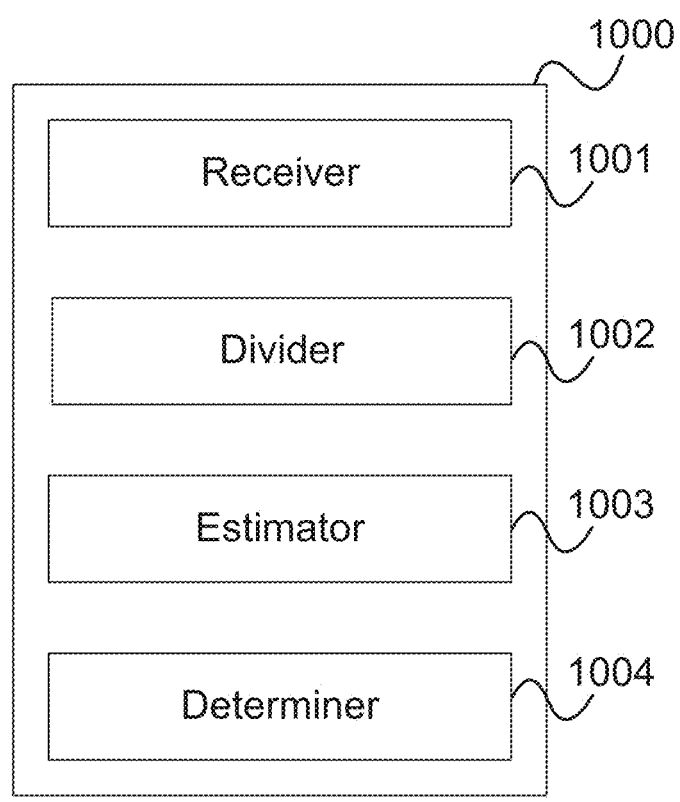
FIG. 10 shows a communication device.

In summary, according to various examples, a communication device as illustrated in FIG. 10 is provided.

FIG. 10 shows a communication device 1000.

The communication device 1000 includes a receiver 1001 configured to receive a signal and a divider 1002 configured to divide the signal into a plurality of signal components.

The communication device 1000 further includes an estimator 1003 configured to estimate, for each signal component, an expected processing error which is made when, instead of a first processing scheme, a second processing scheme is used to process the signal component, wherein the first processing scheme has a higher processing effort than the second processing scheme. Further, the communication device 1000 includes a determiner 1004 configured to determine, for each signal component, whether to process the signal component by the first processing scheme or by the second processing scheme based on the expected processing errors According to various examples, in other words, a communication device estimates the errors which are made for signal components if a simplified processing is applied to the signal components and, when there is a limit of the number of signal components to which high effort processing can be applied (e.g. due to a limitation of computational resources), optimizes the distribution (or allocation) of the signal components to the various processing options with regard to the estimated total error that occurs. It should be noted that the minimization of a total expected processing error may be understood as the search for an allocation which leads to the actual minimum under the given side conditions (including e.g. the limit of the number of signal components to which high effort processing can be applied) but may also include an approach where an allocation is used which is not quite optimal, but is determined by means of a minimization procedure (e.g. an allocation which is within a certain range of the optimum solution).

The first processing scheme having a higher processing effort than the second processing scheme may mean that the first processing scheme requires more computational resources than the second processing scheme or that the first processing scheme requires more memory resources than the second processing scheme (or both) and that the first processing scheme give a more accurate processing result than the second processing scheme.

The determination (or decision) which determines, for each signal component, whether to process the signal component by the first processing scheme or by the second processing scheme may be a performed by means of a decision process that jointly decides for the signal components whether to process the signal component by the first processing scheme or by the second processing scheme. Thus, the determination for each signal component may be understood to include a joint decision process.

The second processing scheme may include a first variant leading to a positive processing error and a second variant leading to a negative processing error (e.g. two different puncturing schemes as described above), wherein the determiner is configured to determine, for each signal component to be processed by the second processing scheme, whether to process the signal component by the first variant or the second variant. A positive processing error for example leads to a reception quality estimate that is better than an actual reception quality estimate and a negative processing error for example leads to a reception quality estimate that is worse than an actual reception quality estimate.

The communication device may for example be a communication terminal (e.g. a subscriber terminal of a cellular mobile communication network) and the signal may for example be a downlink signal received from a base station. However, the communication device may also be a base station and the reception of the signal may relate to a communication between base stations (in a wireless fashion). The signal may also be a signal received from another communication terminal (i.e. the signal transmission and reception may relate to a communication between two communication terminals, e.g. two mobile phones).

The components of the communication device (e.g. the receiver, the divider, the estimator, the determiner and the processor) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

The communication device for example carries out a method as illustrated in FIG. 11.

FIG. 11 shows a flow diagram 1100 illustrating a method for processing a signal, for example carried out by a communication device.

In 1101, the communication device receives a signal.

In 1102, the communication device divides the signal into a plurality of signal components.

In 1103, the communication device estimates, for each signal component, an expected processing error which is made when, instead of a first processing scheme, a second processing scheme is used to process the signal component, wherein the first processing scheme has a higher processing effort than the second processing scheme.

In 1104, the communication device determines, for each signal component, whether to process the signal component by the first processing scheme or by the second processing scheme based on the expected processing errors.

The following examples pertain to further embodiments.

Example 1 is a communication device as illustrated in FIG. 10.

In Example 2, the subject matter of Example 1 may optionally include the determiner being configured to determine, for each signal component, whether to process the signal component by the first processing scheme or by the second processing scheme further based on a minimization of a total expected processing error resulting from the expected processing errors.

In Example 3, the subject matter of any one of Examples 1-2 may optionally include the determiner being configured to determine, for each signal component, whether to process the signal component by the first processing scheme or by the second processing scheme further based on a limit of the number of signal components to be processed using the first processing scheme.

In Example 4, the subject matter of any one of Examples 1-3 may optionally include a processor configured to process each signal component according to the determined processing scheme.

In Example 5, the subject matter of any one of Examples 1-4 may optionally include the processing being a reception quality estimation.

In Example 6, the subject matter of any one of Examples 1-5 may optionally include the processor being configured to generate a link estimate based on the processing of the signal components and the communication device further comprising a transmitter configured to transmit the link estimate to a component of a communication network.

In Example 7, the subject matter of any one of Examples 1-6 may optionally include the divider being configured to divide the signal into the plurality of signal components based on a similarity criterion of the reception quality of the signal components.

In Example 8, the subject matter of Example 7 may optionally include the divider being configured to divide the signal into the plurality of signal components such that the reception quality within each signal component satisfies the similarity criterion.

In Example 9, the subject matter of any one of Examples 1-8 may optionally include the divider being configured to divide the signal into the plurality of signal components such that the reception quality within each signal component being within a predetermined range.

In Example 10, the subject matter of any one of Examples 1-9 may optionally include the divider being configured to divide the signal into the plurality of signal components based on a condition that each signal component corresponds to a predetermined interference level.

In Example 11, the subject matter of any one of Examples 1-10 may optionally include the determiner being configured to determine the total expected processing error based on a weighing of the expected processing error of each signal component depending on the size of the contribution of the signal component to the received signal.

In Example 12, the subject matter of any one of Examples 1-11 may optionally include each signal component comprising a plurality of resource elements.

In Example 13, the subject matter of any one of Examples 12 may optionally include each signal component corresponding to a resource element group and the divider being configured to divide the signal into the plurality of signal components by grouping the resource elements of the plurality of resource elements to resource element groups.

In Example 14, the subject matter of any one of Examples 1-13 may optionally include the determiner being configured to determine the total expected processing error based on a weighing of the expected processing error of each signal component depending on the number of resource elements of the signal component.

In Example 15, the subject matter of any one of Examples 1-14 may optionally include the second processing scheme including a first variant leading to a positive processing error and a second variant leading to a negative processing error and the determiner being configured to determine, for each signal component to be processed by the second processing scheme, whether to process the signal component by the first variant or the second variant based on a minimization of the total expected processing error resulting from the expected processing errors and the communication device comprising a processor configured to process the signal component according to the determined variant.

In Example 16, the subject matter of Example 15 may optionally include the determiner being configured to minimize the total expected processing error resulting from the expected processing errors by compensating positive processing errors with negative processing errors.

In Example 17, the subject matter of any one of Examples 15-16 may optionally include the determiner being configured to determine, for each signal component to be processed by the second processing scheme, whether to process the signal component by the first variant or the second variant based on a condition that the total expected processing error resulting from the expected processing errors being to be negative.

In Example 18, the subject matter of any one of Examples 15-17 may optionally include processing a signal component according to the first variant including determining an estimate of the reception quality of the signal component to be equal to a predetermined maximum reception quality and processing a signal component according to the second variant including determining an estimate of the reception quality of the signal component to be equal to a predetermined minimum reception quality.

In Example 19, the subject matter of any one of Examples 15-18 may optionally include processing a signal component according to the first variant including determining an estimate of the reception quality of the signal component to be equal to a reference reception quality and processing a signal component according to the second variant including determining an estimate of the reception quality of the signal component to be equal to a reception quality which being not sufficient for data transmission.

In Example 20, the subject matter of Example 19 may optionally include the reference reception quality being a reception quality of a reference signal received by the communication device.

In Example 21, the subject matter of any one of Examples 1-20 may optionally include the processing error being a bias of a link quality metric.

Example 22 is a method for processing a signal as illustrated in FIG. 11.

In Example 23, the subject matter of Example 22 may optionally include determining, for each signal component, whether to process the signal component by the first processing scheme or by the second processing scheme further based on a minimization of a total expected processing error resulting from the expected processing errors.

In Example 24, the subject matter of any one of Examples 22-23 may optionally include determining, for each signal component, whether to process the signal component by the first processing scheme or by the second processing scheme further based on a limit of the number of signal components to be processed using the first processing scheme.

In Example 25, the subject matter of any one of Examples 22-24 may optionally include processing each signal component according to the determined processing scheme.

In Example 26, the subject matter of any one of Examples 22-25 may optionally include the processing being a reception quality estimation.

In Example 27, the subject matter of any one of Examples 22-26 may optionally include generating a link estimate based on the processing of the signal components and transmitting the link estimate to a component of a communication network.

In Example 28, the subject matter of any one of Examples 22-27 may optionally include dividing the signal into the plurality of signal components based on a similarity criterion of the reception quality of the signal components.

In Example 29, the subject matter of Example 28 may optionally include dividing the signal into the plurality of signal components such that the reception quality within each signal component satisfies the similarity criterion.

In Example 30, the subject matter of any one of Examples 22-31 may optionally include dividing the signal into the plurality of signal components such that the reception quality within each signal component being within a predetermined range.

In Example 31, the subject matter of any one of Examples 22-30 may optionally include dividing the signal into the plurality of signal components based on a condition that each signal component corresponds to a predetermined interference level.

In Example 32, the subject matter of any one of Examples 22-31 may optionally include determining the total expected processing error based on a weighing of the expected processing error of each signal component depending on the size of the contribution of the signal component to the received signal.

In Example 33, the subject matter of any one of Examples 22-32 may optionally include each signal component comprising a plurality of resource elements.

In Example 34, the subject matter of Example 33 may optionally include each signal component corresponding to a resource element group and the method comprising dividing the signal into the plurality of signal components by grouping the resource elements of the plurality of resource elements to resource element groups.

In Example 35, the subject matter of any one of Examples 22-34 may optionally include determining the total expected processing error based on a weighing of the expected processing error of each signal component depending on the number of resource elements of the signal component.

In Example 36, the subject matter of any one of Examples 22-35 may optionally include the second processing scheme including a first variant leading to a positive processing error and a second variant leading to a negative processing error—may optionally include the method comprising determining, for each signal component to be processed by the second processing scheme, whether to process the signal component by the first variant or the second variant based on a minimization of the total expected processing error resulting from the expected processing errors and processing the signal component according to the determined variant.

In Example 37, the subject matter of Example 36 may optionally include minimizing the total expected processing error resulting from the expected processing errors by compensating positive processing errors with negative processing errors.

In Example 38, the subject matter of any one of Examples 36-37 may optionally include determining, for each signal component to be processed by the second processing scheme, whether to process the signal component by the first variant or the second variant based on a condition that the total expected processing error resulting from the expected processing errors being to be negative.

In Example 39, the subject matter of any one of Examples 36-38 may optionally include processing a signal component according to the first variant including determining an estimate of the reception quality of the signal component to be equal to a predetermined maximum reception quality and processing a signal component according to the second variant including determining an estimate of the reception quality of the signal component to be equal to a predetermined minimum reception quality.

In Example 40, the subject matter of any one of Examples 36-39 may optionally include processing a signal component according to the first variant including determining an estimate of the reception quality of the signal component to be equal to a reference reception quality and processing a signal component according to the second variant including determining an estimate of the reception quality of the signal component to be equal to a reception quality which being not sufficient for data transmission.

In Example 41, the subject matter of Example 40 may optionally include the reference reception quality being a reception quality of a received reference signal.

In Example 42, the subject matter of any one of Examples 22-41 may optionally include the processing error being a bias of a link quality metric.

Example 43 is a computer readable medium having recorded instructions thereon which, when executed by a processor, make the processor perform a method for processing a signal according to any one of Examples 22 to 42.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A communication device comprising:
   a receiver circuit configured to receive a signal;
   a divider circuit coupled to the receiver circuit and configured to divide the signal into a plurality of signal components;
   an estimator circuit coupled to the divider circuit and configured to estimate, for each signal component, an expected processing error which is made when, instead of a first processing scheme, a second processing scheme is used to process the signal component, wherein the expected processing error represents a loss in accuracy when determining a link quality assessment for the signal using the second processing scheme, and wherein the first processing scheme has a higher processing effort than the second processing scheme;
- a determiner circuit coupled to the estimator circuit and configured to determine, for each signal component, whether to process the signal component by the first processing scheme or by the second processing scheme based on the expected processing errors; and
- a processor coupled to the determiner circuit and configured to process each signal component according to a determined one of the first processing scheme or the second processing scheme to determine the link quality assessment for the signal.

2. The communication device of claim 1, wherein the determiner is configured to determine, for each signal component, whether to process the signal component by the first processing scheme or by the second processing scheme further based on a minimization of a total expected processing error resulting from the expected processing errors.

3. The communication device of claim 1, wherein the determiner is configured to determine, for each signal component, whether to process the signal component by the first processing scheme or by the second processing scheme further based on a limit of a number of signal components to be processed using the first processing scheme.

4. The communication device of claim 1, wherein the processing is a reception quality estimation.

5. The communication device of claim 1, wherein the processor is configured to generate a link estimate based on the processing of the signal components and the communication device further comprises a transmitter configured to transmit the link estimate to a component of a communication network.

6. The communication device of claim 1, wherein the divider is configured to divide the signal into the plurality of signal components based on a similarity criterion of a reception quality of the signal components.

7. The communication device of claim 6, wherein the divider is configured to divide the signal into the plurality of signal components such that the reception quality within each signal component satisfies the similarity criterion.

8. The communication device of claim 1, wherein the divider is configured to divide the signal into the plurality of signal components such that a reception quality within each signal component is within a predetermined range.

9. The communication device of claim 1, wherein the divider is configured to divide the signal into the plurality of signal components based on a condition that each signal component corresponds to a predetermined interference level.

10. The communication device of claim 1, wherein the determiner is configured to determine a total expected processing error based on a weighing of the expected processing error of each signal component depending on a size of a contribution of the signal component to the received signal.

11. The communication device of claim 1, wherein each signal component comprises a plurality of resource elements.

12. The communication device of claim 11, wherein each signal component corresponds to a resource element group and the divider is configured to divide the signal into the plurality of signal components by grouping the resource elements of the plurality of resource elements to resource element groups.

13. The communication device of claim 1, wherein the determiner is configured to determine a total expected processing error based on a weighing of the expected processing error of each signal component depending on a number of resource elements of the signal component.

14. The communication device of claim 1, wherein the second processing scheme includes a first variant leading to a positive processing error and a second variant leading to a negative processing error, wherein the determiner is configured to determine, for each signal component to be processed by the second processing scheme, whether to process the signal component by the first variant or the second variant based on a minimization of a total expected processing error resulting from the expected processing errors and wherein the processor is configured to process the signal component according to the determined variant.

15. The communication device of claim 14, wherein the determiner is configured to minimize a total expected processing error resulting from the expected processing errors by compensating positive processing errors with negative processing errors.

16. The communication device of claim 14, wherein the determiner is configured to determine, for each signal component to be processed by the second processing scheme, whether to process the signal component by the first variant or the second variant based on a condition that a total expected processing error resulting from the expected processing errors is to be negative.

17. The communication device of claim 14, wherein processing a signal component according to the first variant includes determining an estimate of a reception quality of the signal component to be equal to a predetermined maximum reception quality and processing a signal component according to the second variant includes determining an estimate of the reception quality of the signal component to be equal to a predetermined minimum reception quality.

18. A method for processing a signal comprising:
- receiving a signal;
- dividing the signal into a plurality of signal components;
- estimating, for each signal component, an expected processing error which is made when, instead of a first processing scheme, a second processing scheme is used to process the signal component, wherein the expected processing error represents a loss in accuracy when determining a link quality assessment for the signal using the second processing scheme, and wherein the first processing scheme has a higher processing effort than the second processing scheme;
- determining, for each signal component, whether to process the signal component by the first processing scheme or by the second processing scheme based on the expected processing errors; and
- processing each signal component according to a determined one of the first processing scheme or the second processing scheme to determine the link quality assessment for the signal.

19. A non-transitory computer readable storage medium having recorded instructions thereon which, when executed by a processor, cause the processor to:
- receive a signal;
- divide the signal into a plurality of signal components;
- estimate, for each signal component, an expected processing error which is made when, instead of a first processing scheme, a second processing scheme is used to process the signal component, wherein the expected processing error represents a loss in accuracy when determining a link quality assessment for the signal using the second processing scheme, and wherein the first processing scheme has a higher processing effort than the second processing scheme;

determine, for each signal component, whether to process the signal component by the first processing scheme or by the second processing scheme based on the expected processing errors; and process each signal component according to a determined one of the first processing scheme or the second processing scheme to determine the link quality assessment for the signal.

* * * * *